May 17, 1966   J. S. SENEY   3,251,918
PROCESS FOR MAKING A CAPACITOR ELEMENT FOR HIGH
TEMPERATURE OPERATION
Filed June 14, 1961
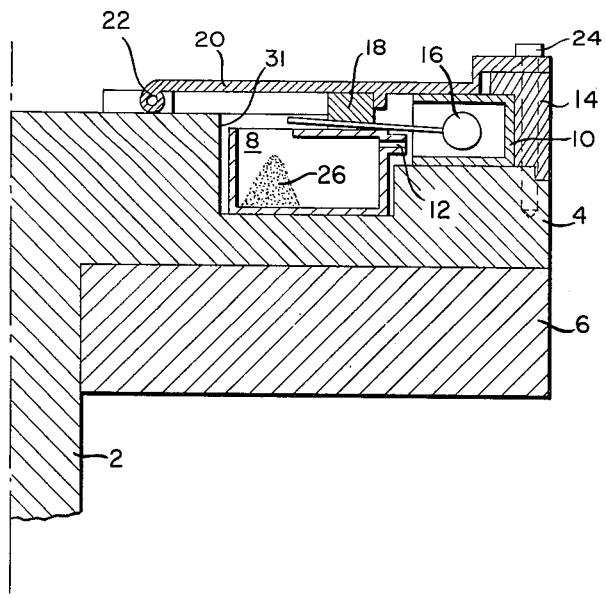
INVENTOR
JOHN SEYMOUR SENEY
BY *Harry C. Braddock*
ATTORNEY

United States Patent Office 3,251,918
Patented May 17, 1966

3,251,918
PROCESS FOR MAKING A CAPACITOR ELEMENT FOR HIGH TEMPERATURE OPERATION
John Seymour Seney, Seaford, Del., assignor to E. I. du Pont de Nemours and Company, Wilmington, Del., a corporation of Delaware
Filed June 14, 1961, Ser. No. 117,082
1 Claim. (Cl. 264—135)

This invention relates to methods of encapsulating electrical devices and, more particularly, to an improved method of encapsulating capacitor elements.

Many electrical components and particularly capacitors are used without being encapsulated or potted. However, the need for various forms of protection has existed; and previously it appears that only low-temperature materials, such as wax, etc., have been used for such items. Recently, a requirement has arisen for electrical components and, in particular, capacitor elements, capable of operating at elevated temperatures and under high accelerating forces. Ceramic capacitors have been developed for this; however, the normal materials for making the electrical connections to capacitors have not been found satisfactory in operation at the high temperatures, probably because of oxidation. The most satisfactory material that has been found for the condenser or capacitor plates is silver. The capacitor element consists generally of the silver plates supported on a ceramic material and provided with suitable lead wires. High temperatures also have deleterious effects on the silver plates and cause rapid oxidation thereof. Therefore, both connections and the silver plates need to be protected.

Another difficulty encountered in operating electrical components and capacitors at elevated temperatures, is that the capacitance characteristics of the components do not remain stable when subjected to a radical change in temperature. This is believed to be related to the change in geometry and dimensions caused by changes in the temperature. In many instances, their characteristics change so much that they become useless.

It is obvious for a capacitor element to operate at an elevated temperature that the encapsulating material must be capable of suitably withstanding this high temperature. In most instances, the encapsulating material becomes fluid at temperatures higher than the operating temperature. It has been found that under normal potting or encapsulating techniques the silver plates oxidize rapidly while bringing the capacitor up to the temperature for encapsulation. This is undesirable and it has been necessary to develop a method to overcome this undesirable situation.

Previously, in many encapsulation techniques, the encapsulating material was simply poured into the mold and surrounded the device to be encapsulated. This permitted bubbles and air pockets to form. In most low-temperature applications this condition was not too damaging, but it cannot be tolerated with units intended for satisfactory operation at high temperature.

This invention has among its objects the following:

The production of an improved capacitor element with increased capacitance and improved stability.

The production of an encapsulated capacitor element for high-temperature operation which is not deleteriously affected during the encapsulation process.

The production of an encapsulated capacitor element which readily can be mounted to other component parts without affecting the capacitor characteristics.

The production of a dense, homogeneous, complete encapsulation, free from air bubbles and other voids or cracks.

The provision of an encapsulated capacitor element for high-temperature operation which is protected from the adverse effect of a surrounding atmosphere.

The provision of a new and improved method of encapsulating electrical units.

Applicant's improved process which achieves the above objects involves encapsulating components (which would be deleteriously affected by the expected normal working temperatures and by temperatures approaching the expected working temperatures as encountered during conventional encapsulation processes) by a process comprising the steps of applying a preliminary coating, rapidly preglazing the preliminary coating on the component, mounting the component in a mold, heating the component and mold, melting a pre-measured amount of encapsulating compound, subjecting the component, mold, and molten compound to centrifugal force so as to cause the molten compound to enter the mold and encapsulate the component, and solidifying the compound in a homogeneous void-free mass surrounding the component.

Further objects and advantages will appear from a consideration of the following specification and claim together with the accompanying drawing which is a partial longitudinal cross section through one version of the centrifugal apparatus used in carrying out the encapsulation step.

As shown in the drawing, the apparatus for centrifugally encapsulating capacitors includes a drive shaft 2 driven by an appropriate motor and speed control unit (not shown). Mounted on the drive shaft 2 is a cylindrical main block member 4 and an annular heater block member 6 fitted thereto. Suitably mounted in the heater block member 6 are electrical heaters of conventional design, such as Calrod heaters (not shown) which may have electrical connections through conventional means such as rotary slip rings (not shown) as well known in the art. The temperature is controlled in any desirable manner such as by a thermocouple mounted on the rotating members and connected to a temperature controller unit through the slip rings. The temperature controller unit controls the amount of electrical energy supplied to the heater elements in a conventional way. The main block member is provided with a number of circumferentially spaced radially disposed cut-out portions, one of which has been designated by reference numeral 31. Each cut-out portion is constructed and arranged to contain a reservoir or container 8 for powdered encapsulating material and a mold unit 10 in which the component to be encapsulated is positioned. The reservoir 8 is provided with a conduit section or nozzle 12 leading into the mold unit 10. A locating and securing ring 14 is used to position and partially clamp the mold units 10 and reservoirs 8 in position in the main block. A capacitor element 16 is positioned in the mold unit 10 by its lead wires which are threaded through an assembly block or positioning element 18. Clamp members 20, hinged at points 22, are pivotally movable into engagement with ring 14 to clamp assembly blocks 18, reservoir elements 8 and mold units 10 firmly in position. Clamp ring 14 and clamp members 20 are secured to the main block member 4 by a plurality of machine screws 24. Clamp members 20 and reservoir elements 8 are provided with suitable openings so that the encapsulating molding powder can be conveniently supplied into the reservoir elements as indicated by 26.

Applicant has found that it is necessary to precoat and preglaze the capacitor elements to protect the silver plates so that during the heating of the elements prior to encapsulation, the silver plates are not oxidized. The first treatment of the capacitor element consists of coating the element with a suitable solution or slurry of the final encapsulating material, letting it air dry and then drying it in an oven to drive off the solvent or slurry vehicle.

The second treatment is to dip the precoated capacitor element into an atmosphere at a sufficiently high temperature for a time interval to cause the coating to flow and glaze. In this carefully controlled time interval, which is very short, the silver plates do not have a chance to oxidize before the precoating becomes glazed.

The third treatment is to mount the capacitor element into an apparatus similar to that shown in the drawing and described above. The main block is preheated by applying heat by the heaters mounted in the heater block member 6, to a temperature above the melting temperature of the powdered encapsulating material. The assembled capacitor elements 16, mold units 10, reservoir elements 8, etc., are allowed to soak at the elevated temperature in the apparatus for sufficient time to bring these units up to the desired operating temperature. After this temperature is reached a premeasured amount of powderer encapsulating material is rapidly supplied to the reservoirs 8 and the apparatus secured in the operating position by bolts 24. The powder comes up to temperature very rapidly. The main block-heater block assembly is rotated at a very high speed immediately after the powder is inserted. When the powder comes up to temperature, it becomes liquid in form and remains in this form for only a short time. After this extremely short time, the encapsulating material solidifies. Due to the action of the centrifugal force on the rotated parts, the liquid encapsulating material is directed through nozzle 12 into the mold unit 10 to surround and encapsulate the capacitor element 16. Since it solidifies after a short time, the temperature is not usually reduced and the unit can be almost removed immediately; that is, the mold assembly containing the encapsulated capacitor element can be removed from the apparatus while hot and cooled before removal of the encapsulated element.

The following examples illustrate the preferred practice of the invention.

*Example I*

Standard doped barium-titanate, 0.004 mfd., 1,000 volt disc-type capacitors may be obtained commercially. The commercial suppliers usually attach a .005 inch thick, ¼ inch diameter silver disc to the previously fired-on silver capacitor plates by sintering with a powdered silver paste. This disc has spot-welded nickel leads attached to it prior to sintering. These capacitors are then given a preliminary coating by dipping into a slurry of Pyroceram No. 95—No. 2 cement (a devitrifiable glass powder marketed by Corning Glass Works and described in U.S. 2,889,952), and amyl acetate, ratio mixture 8.05 to 1 by weight. The capacitors are then air dried at room temperature for three hours, then redipped and again air dried for three hours at room temperature. They are then baked for twenty-four hours at 100° C. Next, they are inserted into a vertical muffle furnace set at 632° C., where the heated capacitor can be closely observed. Upon the observation of glazing, the capacitor is removed and allowed to air cool in the room air. The glazing heat cycle usually requires approximately one minute. The capacitors are then ready for final encapsulation. The encapsulating process is carried out as described above with the encapsulating cycle as follows: Temperature of the apparatus—450° C.; capacitor preheat time in the centrifuge—five minutes; capacitor spinning time after insertion of the devitrifiable glass molding powder—five minutes, followed by rapid removal of the capacitor from the heated apparatus; r.p.m. of the assembly—one thousand. The capacitor is allowed to cool in room air after removal from the apparatus.

It was discovered from a number of measurements that, surprisingly, this encapsulation method increased the capacitance and the stability of the capacitor elements. For example, the unencapsulated capacitor as received had an averable capacitance of .00407 mfd. After glazing, the capacitance had increased to 0.004136; after encapsulation, the capacitance had increased to .00446 mfd.—an increase of almost 10 percent.

Frequently, these capacitors are used where the temperature is maintained at an elevated point during normal operating conditions; but at a shut-down, the temperature is allowed to reduce considerably. Upon start-up, the temperature is again returned to its elevated point. Capacitors, as mentioned in Example I above, purchased and received from the commercial manufacturer (and in addition, encapsulated according to conventional practice), have not been sufficiently temperature stable, while the similar units, after encapsulation, according to this invention, are stabilized to significantly increased degree as indicated in the following.

*Example II*

A test for stability consisted of mounting a number of capacitors in a temperature-controlled block. The temperature was increased from 50° C. to 220° C. in approximately twenty minutes. It was then reduced back to 50° C. in approximately five minutes. The cycle was repeated a number of times with capacitor elements encapsulated according to conventional practice and with capacitor elements encapsulated according to this invention.

*Conventionally encapsulated capacitors.*—Most failed to function at all between 2–10 cycles—a rare unit would survive 250 or 300 cycles.

*Capacitors encapsulated according to this invention.*—Twenty units were all functioning and still stable after 3,000 cycles when test was discontinued.

The following is given as a possible explanation of the mechanism whereby the encapsulation process of this invention increases the capacitance and temperature stability of a capacitance element. However, it is recognized that other explanations may be more correct. During encapsulation by the present process, the capacitor is subjected to high compressive forces. As the encapsulation material solidifies, these compressive forces are maintained and, in fact, may be increased due to shrinkage of the material. It is believed that these forces are in effect "locked-in," compressing the dielectric between the capacitor plates, to increase the capacitance of the element.

The increased temperature stability results from the fact that the locked-in compressive forces, acting on the unit, change only an insignificant amount when the temperature changes, as compared with a conventionally encapsulated unit which having no external forces is free to expand and contract with temperature changes.

After cooling, the encapsulated capacitor can either be removed from the mold or kept in the unit 10. In either event, this unit can easily be mechanically mounted into other equipment and mounting pressure applied to it without adversely affecting the electrical characteristics of the capacitor. If it were not so encapsulated, conventional mounting techniques would adversely affect the electrical characteristics of the capacitor.

While the foregoing description has emphasized encapsulating capacitor elements, it is obvious that this technique can be used with many electrical devices or assemblies. In addition, it can be used advantageously where encapsulation is required and where the high temperature during encapsulation may adversely affect some of the components of the unit or units being encapsulated.

Although a preferred embodiment of the invention has been disclosed in accordance with the patent statutes, it will be understood that many modifications will occur to those skilled in the art, and fall within the spirit of the invention and the scope of the following claim.

I claim:

A process for encapsulating a capacitor including metallic plates which are subject to detrimental oxidation during prolonged exposure to air at a given encapsulating temperature above 400° C., said process comprising the steps of applying to the entire surface of said capacitor a slurry comprising a devitrifiable glass material and a vehicle; removing the vehicle in a drying operation to leave the material deposited in a thin layer on said capacitor; rapidly heating the exterior of said capacitor to a glazing temperature above 500° C. for an extremely short period of time insufficient to cause significant oxidation of said plates yet sufficient to bond and glaze the thin layer on the capacitor in an air tight coating; thereafter heating said capacitor to said given temperature in an enclosed zone; maintaining said given temperature while surrounding said capacitor with an additional amount of said devitrifiable glass material in molten form and simultaneously subjecting the capacitor, the additional material and the enclosed zone to centrifugal forces to insure homogeneous disposition of the material about the capacitor, said given encapsulating temperature being above the melting point of said material; and then allowing the capacitor and surrounding material to cool as an encapsulated assembly.

References Cited by the Examiner

UNITED STATES PATENTS

| | | | |
|---|---|---|---|
| 2,525,668 | 10/1950 | Gray | 117—212 |
| 2,633,543 | 3/1953 | Howatt | 310—9.8 |
| 2,695,856 | 11/1954 | Firth | 264—272 XR |
| 2,850,687 | 9/1958 | Hammes | 264—272 XR |
| 2,904,733 | 9/1959 | Robinson et al. | 317—258 |
| 2,949,640 | 8/1960 | Collins et al. | 18—59 |
| 2,957,114 | 10/1960 | Lamphier | 317—258 |
| 2,961,350 | 11/1960 | Flaschen et al. | 117—200 |
| 2,972,570 | 2/1961 | Hass et al. | 317—258 XR |
| 2,975,078 | 3/1961 | Rayfield | 117—231 |
| 2,997,635 | 8/1961 | Robinson | 317—258 |
| 3,099,044 | 7/1963 | Reuter. | |
| 3,110,619 | 11/1963 | Koenig et al. | 117—231 |
| 3,124,478 | 3/1964 | Cirkler et al. | 117—200 |

ALFRED L. LEAVITT, *Primary Examiner.*

JOHN R. BURNS, ROBERT F. WHITE, *Examiners.*

I. S. RAPPAPORT, L. S. SQUIRES, *Assistant Examiners.*